United States Patent
Weldon et al.

(10) Patent No.: US 8,601,491 B1
(45) Date of Patent: Dec. 3, 2013

(54) UNIVERSAL MASTER CONTROL STATION SYSTEM

(75) Inventors: Bert M. Weldon, Huffman, TX (US); Artemus Ward Hancock, Jr., Katy, TX (US); Anthony King Ho, Houston, TX (US); Van Kent Wilson, Spring, TX (US)

(73) Assignee: Englobal Corporation, Houston, TX (US)

( * ) Notice: Subject to any disclaimer, the term of this patent is extended or adjusted under 35 U.S.C. 154(b) by 216 days.

(21) Appl. No.: 13/284,765

(22) Filed: Oct. 28, 2011

(51) Int. Cl.
  *G06F 3/00* (2006.01)
  *G06F 9/445* (2006.01)

(52) U.S. Cl.
  USPC .............................. 719/316; 719/332; 717/174

(58) Field of Classification Search
  None
  See application file for complete search history.

(56) References Cited

U.S. PATENT DOCUMENTS

| 7,089,561 B2* | 8/2006 | Morrison et al. | 719/312 |
| 7,865,872 B2* | 1/2011 | Chamieh et al. | 717/108 |
| 2008/0244559 A1* | 10/2008 | Imasato et al. | 717/174 |

OTHER PUBLICATIONS

"Tele-Assistance Task Planning for Dextrous Underwater Manipulation", Pickett, 1998, pp. 1-5.*
"A Modular Control System for Remote Subsea Equipment", Eric Stephen Smith, 2003, pp. 1-255.*

* cited by examiner

*Primary Examiner* — Tuan Dao
(74) *Attorney, Agent, or Firm* — Buskop Law Group, PC; Wendy Buskop

(57) ABSTRACT

A system for controlling subsea components from multiple manufacturers, each having a proprietary communication interface. The system can include a client configuration processor. The client configuration processor can communicate with a client configuration data storage. The client configuration data storage can include a human machine interface client configuration tool and an engineering client configuration tool.

16 Claims, 9 Drawing Sheets

FIGURE 7

| | |
|---|---|
| HUMAN MACHINE INTERFACE DATA STORAGE | 422 |
| COMPUTER INSTRUCTIONS TO RECEIVE AND STORE THE BASE GRAPHIC THEREIN | 424 |
| COMPUTER INSTRUCTIONS TO MONITOR AND CONTROL AN ELECTRICAL POWER UNIT OF EQUIPMENT CONTROLLED BY THE HUMAN MACHINE INTERFACE | 426 |
| COMPUTER INSTRUCTIONS TO MONITOR AND CONTROL A HYDRAULIC POWER UNIT OF EQUIPMENT CONTROLLED BY THE HUMAN MACHINE INTERFACE | 428 |
| COMPUTER INSTRUCTIONS TO PROVIDE AN ALARM HISTORY FOR ALARMS OCCURRING WITH THE SYSTEM | 430 |
| COMPUTER INSTRUCTIONS TO PROVIDE AN EVENT LOG WHEN NON-ALARM EVENTS OCCUR | 432 |
| COMPUTER INSTRUCTIONS TO PROVIDE TRENDING USING VALUES RECORDED BY THE UNIVERSAL MASTER CONTROL STATION | 434 |
| COMPUTER INSTRUCTIONS FOR SCROLLING, SORTING, FILTERING, AND REFRESHING TRENDING | 436 |
| COMPUTER INSTRUCTIONS FOR MONITORING OF TAMPERING WITH EQUIPMENT OR PIPELINES | 440 |
| COMPUTER INSTRUCTIONS FOR A TIME STAMP | 444 |
| COMPUTER INSTRUCTIONS FOR AN ALARM CLASS | 448 |
| COMPUTER INSTRUCTIONS FOR AN ALARM MESSAGE | 450 |

FIGURE 8

| | |
|---|---|
| PROGRAMMABLE CONTROLLER | 500 |
| LOGIC CONTROLLER POWER SUPPLY | 532 |
| ETHERNET INTERFACE | 536 |
| PROGRAMMABLE LOGIC CONTROLLER PROCESSOR | 534 |
| COMPUTER READABLE MEDIUM | 537 |
| COMPUTER INSTRUCTIONS FOR PROGRAMMER FAULT FINDING ALLOWING REDUNDANT MONITORING AND REDUNDANT MANIPULATION FOR THE UNIVERSAL MASTER CONTROL STATION | 538 |

UNIVERSAL MASTER CONTROL STATION SYSTEM

FIELD

The present embodiments generally relate to a system for controlling subsea components from multiple manufacturers, each having a proprietary communication interface.

BACKGROUND

A need exists for a universal master control station configured to allow a user to modify the base system to a fully developed universal master control station that meets the required functionality of a subsea/topside field development. The subsea/topside field development can include a variable number of drill centers, umbilicals, and third party subsea equipment vendors.

A further need exists for a universal master control station that can be configured to meet the functionality of a subsea/topside field development without modification to the code at the programming level.

A further need exists for a universal master control station that establishes a generic solution for operator interface, data exchange, and control execution.

The present embodiments meet these needs.

BRIEF DESCRIPTION OF THE DRAWINGS

The detailed description will be better understood in conjunction with the accompanying drawings as follows:

FIG. 7 depicts the human machine interface data storage according to one or more embodiments.

FIG. 8 depicts a schematic of a programmable controller according to one or more embodiments.

Figure 1:
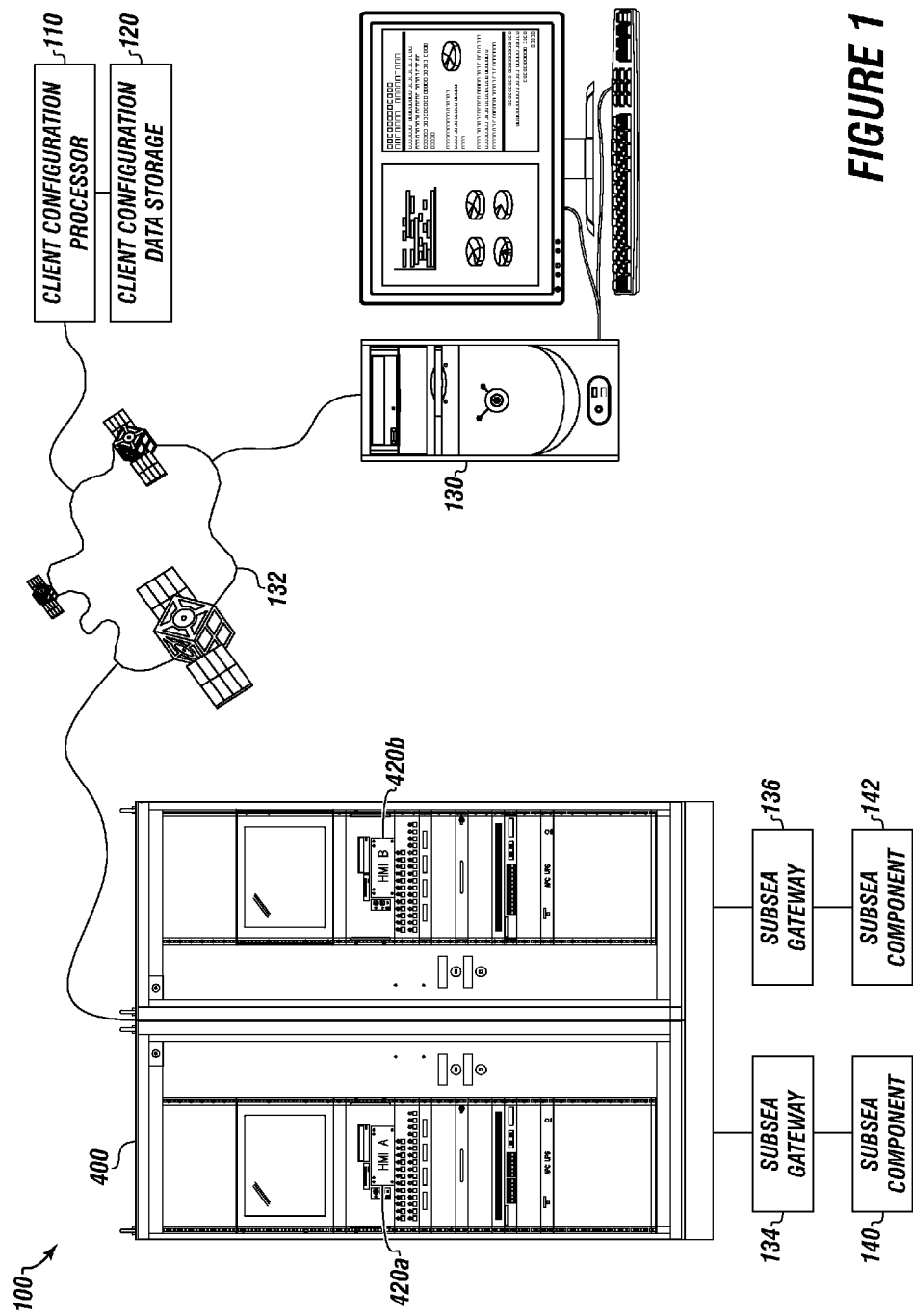
FIG. 1 depicts a schematic of a universal master control station system according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a system for controlling subsea components from multiple manufacturers, where each component can have a proprietary communication interface.

The system can include a client configuration processor. The client configuration processor can be any commercially available processing unit. Illustrative client configuration processors can include personal computing devices, PENTIUM™ processors, AMD™ Processors, INTEL™ Processors, MICRON™ Processors, or the like.

The client configuration processor can be in communication with a client configuration data storage. The client configuration data storage can be a tangible computer readable medium. Illustrative client configuration data storages can include flash drives, diskettes, hard drives, CDs, or the like.

A plurality of class objects can be stored on the client configuration data storage. The class objects can be a blue print of a predetermined object. The predetermined objects can be subsea well components, subsea flow control devices, subsea production equipment, or combinations thereof. A class object can exist for each device type.

Each of the class objects can include a symbolic graphic. The symbolic graphic can be linked to an associated class object. The symbolic graphics can depict graphical representations of the predetermined object associated with the class object. For example, the class object can be for a subsea valve and the subsea valve class object can be linked to a symbolic graphic that depicts an image of the subsea valve.

Each class object can include one or more pop-ups. The pop-ups can be linked to an associated class object. The pop-ups can be linked to the class object and can be used to set parameters for the associated predetermined object. For example, the predetermined object associated with the class object can be a valve, a graphic of the valve can be associated with the valve class object, and in addition, a pop-up can be associated with the valve class object, and the pop-up can receive input from a user to set a pressure at which the valve will open or close.

The class object can also be associated with one or more object methods. The methods can be programming statements to perform actions. The methods can include calculations, logic, permissives, etc. The methods can allow information associated with the class objects to be manipulated. For example, the class object can be a valve, and the method can be a logic statement that if a first pressure entered into an associated pop-up is exceeded the associated valve opens.

The class object can also be associated with control logic. The control logic can be stored in a programmable controller.

The client configuration data storage can also include computer instructions to add an object instance without disability or stopping the operation of a customized universal master control station.

The client configuration data storage can also include a human machine interface client configuration tool. The human machine interface client configuration tool can include library of subsea components.

The library of subsea components can include a plurality of object instances. Each of the object instances can be associated with one of the class objects. The plurality of object instances can include parent object instances and child object instances.

The parent object instance can be a dominate object instance and the child object instance can be dependent therefrom. For example, the valves, sensors, and chokes can be child objects that will be associated/assigned to a tree, which can be the parent object.

The human machine interface client configuration tool can include computer instructions to input and modify configurable set points using the configuration pop-ups associated with each class object; computer instructions to create an interlock status graphic for each parent and child object instance; computer instructions to create configurable alarms for each parent and child object instance; computer instructions allowing a user to assign a memory address for each parent and child object instance; computer instructions allowing a user to assign a parent to each child object instance; computer instructions to form a set of object instances creating an object pool, wherein each child object in the object pool can be assigned to a parent object; computer instructions enabling at least one of the object instances to be assigned to subsea/topside field equipment; computer instructions to permit a user to select the symbols and orient the symbols forming a base graphic; computer instructions to enable a user to select a parent object instance, child object instance or combinations thereof, and place each selected object instance onto the base graphic forming a customized control graphic for existing equipment; computer instructions to replicate child object instances, parent object instances, or combinations thereof for use on the base graphic; computer instructions to display configuration pop-ups, configurable set points, and status information from each selected object instance onto the base graphic; computer instructions to allow modification of the configurable set points for each object instance; and computer instructions to configure alarms for each object instance.

The human machine interface client configuration tool can also include a library of symbols to graphically depict subsea/topside field equipment. The symbols can be simple graphics that are not associated with a class object. The symbols can be graphical representations of non-controllable subsea equipment.

The client configuration data storage can also include an engineering client configuration tool. The client configuration data storage can also include engineering computer instructions for automated development of custom interlocks; engineering computer instructions for automated development of control sequences; engineering computer instructions for automated development of hydrate mitigation sequences; engineering computer instructions providing entry tool choices for client configuration and allowing a user to select an entry tool; engineering computer instructions for saving an entry tool for an interlock configuration, a control sequence, a hydrate mitigation configuration, or combinations thereof; engineering computer instructions for creating a script for conversion using the entry tools to create control code for use by a programmable logic controller; and engineering computer instructions to allow a user to assign text to one or more lookup tables, thereby creating a comprehensive relationship between object instances and the subsea/topside field equipment graphically represented on the customized control graphic.

The system can further include a universal master control station. The universal master control station can include a housing. The housing can have a door.

One or more display monitors can be mounted in the housing. The display monitors can display at least one critical device, at least one health of communication layers, data related to one or more functions of subsea equipment in communication with the universal master control station, or combinations thereof.

The critical device can be a safety valve, a blowout preventer, a lift, or other production equipment.

The housing can also contain one or more human machine interface modules. The human machine interface modules can include one or more human machine interface data storages.

The human machine interface data storage can include computer instructions to receive and store the base graphic therein; computer instructions to monitor and control an electrical power unit of equipment controlled by the human machine interface; computer instructions to monitor and control a hydraulic power unit of equipment controlled by the human machine interface; computer instructions to provide an event log when non-alarm events are stored in the human machine interface; computer instructions to provide trending using values recorded by the universal master control station; and computer instructions for scrolling, sorting, filtering, and refreshing trending.

The human machine interface data storage can also include computer instructions for monitoring of tampering with equipment or pipelines; computer instructions for monitoring of software failure occurring due to writing bad code and improper use of the system stored; computer instructions for a time stamp; computer instructions for an alarm identification; computer instructions for an alarm group; computer instructions to provide an alarm history for alarms occurring with the system; and computer instructions for an alarm message.

In one or more embodiments, alarm histories can be grouped by parent objects. For example, the valve, the sensor, and the choke child objects can be associated/assigned to a tree, have all of their alarms grouped within the tree, which is the parent object.

The human machine interface data storage can further include computer instructions for providing notification to a client device at a remote location when attempts to change or modify a configuration of the universal master control station occur.

The human machine interface module can also include one or more programmable controllers. Illustrative programmable controls can include a Personal Computer. The programmable controllers can be configured to communicate over a network and receive one or more inputs.

In one or more embodiments, the programmable controller can be a programmable logic controller. The programmable logic controller can include a programmable logic controller power supply, a programmable logic controller processor, an Ethernet interface, and computer instructions for programmer fault finding, allowing redundant monitoring and redundant manipulation for the universal master control station.

The human machine interface module can also include one or more communication layers. The communication layers can provide communication between the universal master control station and multiple subsea components from multiple manufacturers via one or more communication layers.

For example, the universal master control station can utilize a standardized communication layer to communicate with various subsea vendor communication servers which in turn utilize unique protocols for subsea communication. The standardized communication layer can be a communication application, such as an OPC server or other communication applications, configured to communicate using various protocols.

The system can also include a remote terminal unit. The remote terminal unit can be in communication with one or more human machine interface modules. The remote terminal unit can communicate with the human machine interface module over a network, such as the internet, a LAN network, a wireless network, or combinations thereof. The remote terminal unit can monitor the universal master control station continuously from a remote location.

One or more embodiments of the system can include computer instructions in the client configuration data storage for preventing configuration of the universal master control station for a production well that exceeds current production standards established by independent agencies, government agencies, or combinations thereof.

In operation, the system for controlling subsea components can be utilized to allow a field operator a wide choice of equipment vendors by providing a universal master control station which can be configured to use standardized communication protocol/memory map. All equipment vendors can utilize the standardized communication protocol/memory map for the interface to the universal master control station. This can allow the universal master control station to communicate with a variety of equipment vendor communication servers. The equipment vendor can maintain their proprietary communication protocol from their communication server to their field equipment. For example, a first vendor can have a first communication server configured to talk with a universal master control station using the standardized communication protocol/memory map and to talk with first subsea components using a first proprietary communication protocol, and a second vendor can have a second communication sever configured to talk with the universal master control station using the standardized communication protocol/memory map and to talk with second subsea components using a second proprietary communication protocol.

In addition, as new zones of an oil field associated with the universal master control station are brought online, the universal master control station can be conveniently mapped using the client configuration tool to streamline the control of the new zone.

Turning now to the Figures, FIG. 1 depicts a schematic of a universal master control station system according to one or more embodiments.

The universal master control station system 100 can include a client configuration processor 110. The client configuration processor 110 can be in communication with the client configuration data storage 120.

The universal master control station system 100 can also include a universal master control station 400.

The universal master control station 400 can include one or more human machine interface modules 420a and 420b. The human machine interface modules are described in more detail below.

A remote terminal unit 130 can communicate with one or more components of the human machine interface modules 420a and 420b via a network 132.

The universal master control station 400 can communicate with subsea components 140 and 142 via gateways 134 and 136. For example, one or more components of the human machine interface modules 420a and 420b can be configured to communicate with, monitor, or combinations thereof various subsea components that are provided by various vendors.

Figure 2:
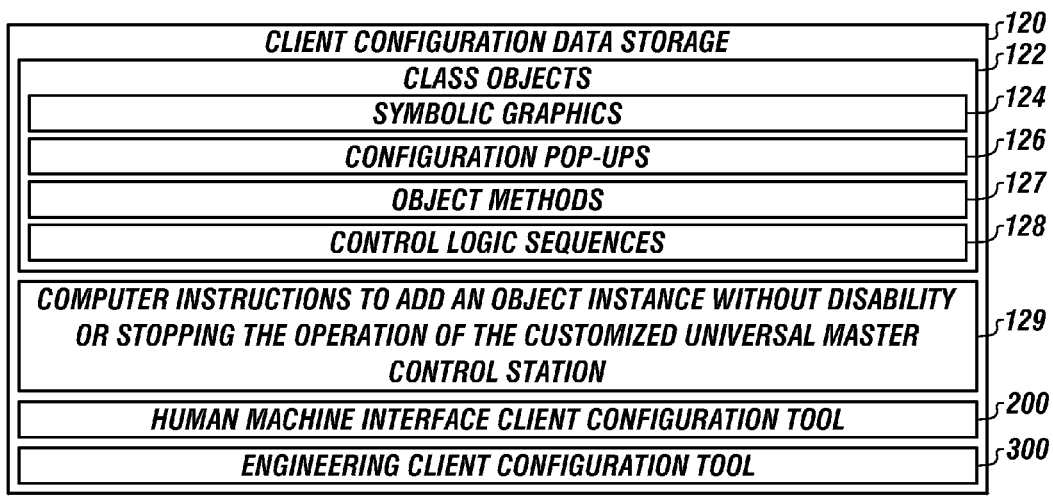
FIG. 2 depicts a schematic of the client configuration data storage according to one or more embodiments.

FIG. 2 depicts a schematic of the client configuration data storage according to one or more embodiments.

The client configuration data storage 120 can include a plurality of class objects 122.

The class objects can include one or more symbolic graphics 124, one or more configuration pop-ups 126, one or more object methods 127, and one or more control logic sequences 128.

The client configuration data storage 120 can include computer instructions to add an object instance without disability or stopping the operation of the customized universal master control station 129.

A human machine interface client configuration tool 200 can be stored on the client configuration data storage 120. The client configuration data storage can also include an engineering client configuration tool 300.

Figure 3:
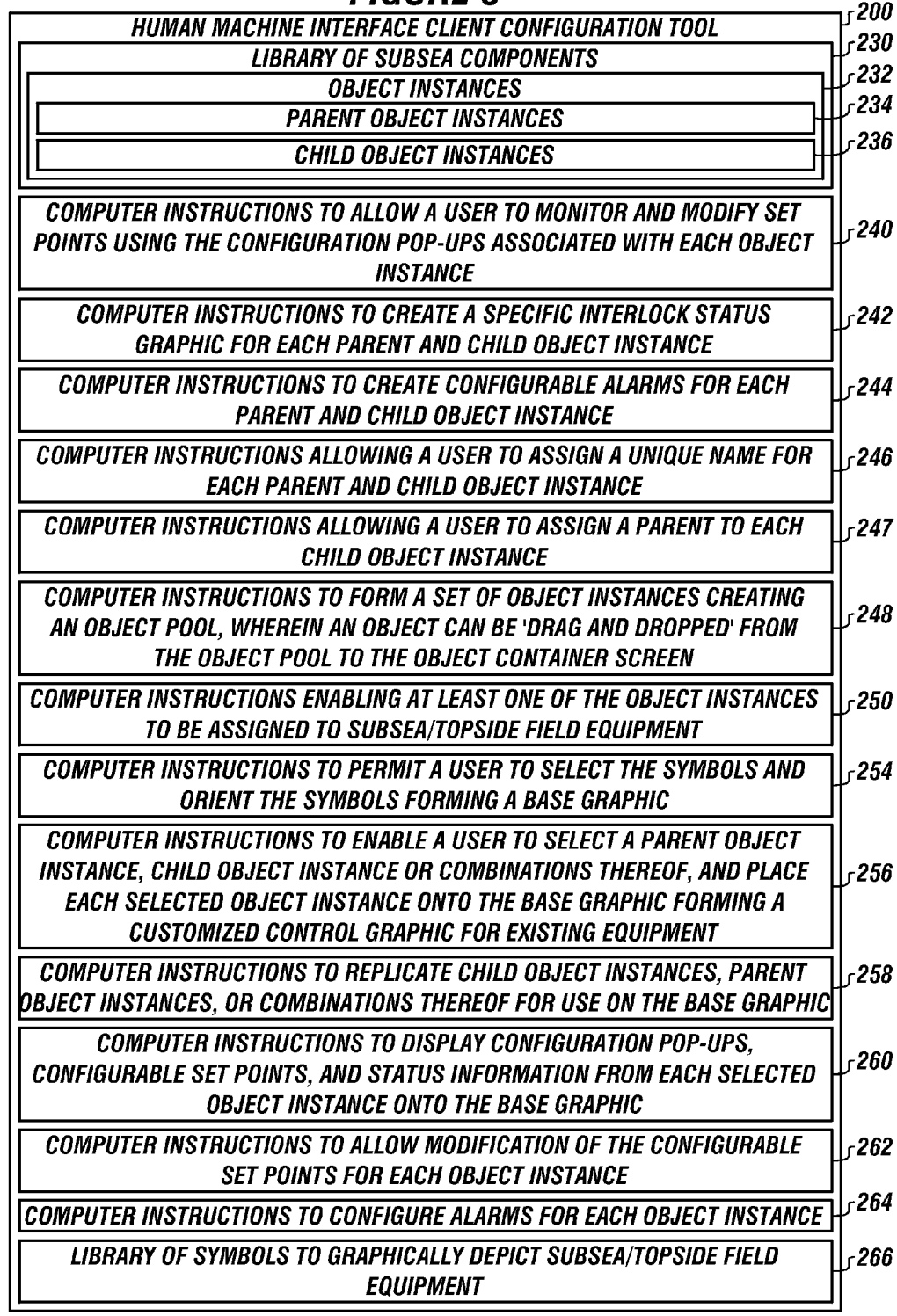
FIG. 3 depicts a schematic of a human machine interface client configuration tool according to one or more embodiments.

FIG. 3 depicts a schematic of a human machine interface client configuration tool according to one or more embodiments.

The human machine interface client configuration tool 200 can include a library of subsea components 230.

The library of subsea components can include a plurality of object instances 232. The object instances 232 can include parent object instances 234 and child object instances 236.

The human machine interface client configuration tool 200 can also include computer instructions to allow a user to monitor and modify set points using the configuration pop-ups associated with each object instance 240. For example, these computer instructions can determine which graphic instance from the plurality of graphic object instances was chosen and allow manipulation of the properties of the specific object instance.

The human machine interface client configuration tool 200 can also include computer instructions to create a specific interlock status graphic for each parent and child object instance 242. These computer instructions allow the user to monitor the safety interlocks, which are currently imposed on each object instance.

The human machine interface client configuration tool 200 can also include computer instructions to create configurable alarms for each parent and child object instance 244. These computer instructions allow user-configuration of alarm set points and custom alarm messages.

The human machine interface client configuration tool 200 can also include computer instructions allowing a user to assign a unique name for each parent and child object instance 246. These computer instructions allow a user to assign a unique memory location for each object instance.

The human machine interface client configuration tool 200 can also include computer instructions allowing a user to assign a parent to each child object instance 247. These computer instructions allow a user to establish a relationship between a parent object and one or more child objects.

The human machine interface client configuration tool 200 can also include computer instructions to form a set of object instances creating an object pool, wherein an object can be 'drag and dropped' from the object pool to the object container screen 248. These computer instructions allow a user to populate a container screen with multiple object instances and assign unique object names thereto.

The human machine interface client configuration tool 200 can also include computer instructions enabling at least one of the object instances to be assigned to subsea/topside field equipment 250. These computer instructions allow a user to link each object instance to the field device by cross-reference via one or more lookup tables. The subsea/topside field equipment can include piping, valves, chemical injection valves, tree valves, intelligent valves, safety valves, chokes, sensors, sand detectors, injection well flow detectors, down hole measurement sensors, erosion detectors, and combinations thereof.

The human machine interface client configuration tool 200 can also include computer instructions to permit a user to select the symbols and orient the symbols forming a base graphic 254. These computer instructions allow a user to build a customized control graphic representing the subsea/topside field equipment.

The human machine interface client configuration tool 200 can also include computer instructions to enable a user to select a parent object instance, child object instance or combinations thereof and place each selected object instance onto the base graphic forming a customized control graphic for existing equipment 256. These computer instructions can allow a user to build a customized control graphic representing the subsea/topside field equipment.

The human machine interface client configuration tool 200 can also include computer instructions to replicate child object instances, parent object instances, or combinations thereof for use on the base graphic 258. These computer instructions allow a user to populate a container screen with multiple object instances and assign unique object names thereto allowing a user to rapidly build a customized control graphic using predefined class objects.

The human machine interface client configuration tool 200 can also include computer instructions to display configuration pop-ups, configurable set points, and status information from each selected object instance onto the base graphic 260. These computer instructions allow the user to monitor the subsea/topside field equipment.

The human machine interface client configuration tool 200 can also include computer instructions to allow modification of the configurable set points for each object instance 262. These computer instructions allow the user to configure each object to represent and control the subsea/topside field equipment.

The human machine interface client configuration tool 200 can also include computer instructions to configure alarms for each object instance 264. These computer instructions allow the user to configure custom alarm set points for each object to monitor the condition of the subsea/topside field equipment.

The human machine interface client configuration tool 200 can also include a library of symbols to graphically depict subsea/topside field equipment 252. The symbols can be simple graphics. For example, the symbols can be graphics depicting a pipe, flow path, platform, or other components.

Figure 4:
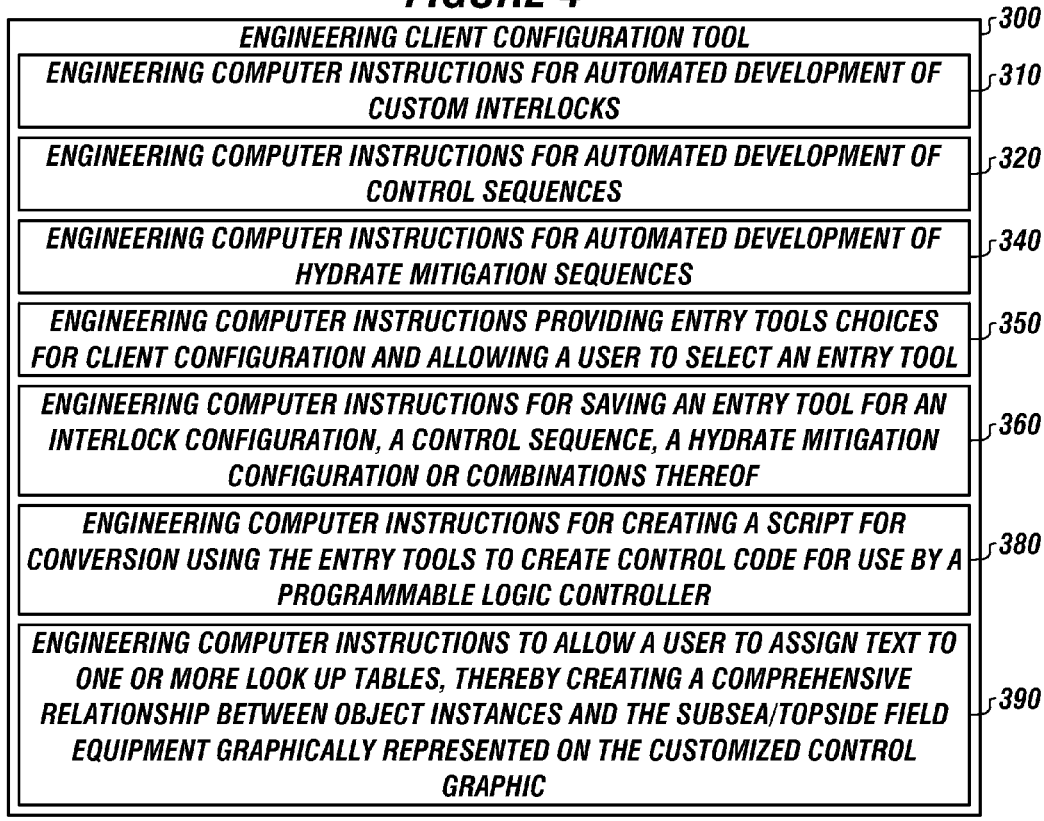
FIG. 4 depicts a schematic of an engineering configuration tool according to one or more embodiments.

FIG. 4 depicts a schematic of an engineering configuration tool according to one or more embodiments.

The engineering client configuration tool 300 can include engineering computer instructions for automated development of custom interlocks 310. These engineering computer instructions allow user-configurable safety interlocks to be imposed on the object instances.

The engineering client configuration tool 300 can include engineering computer instructions for automated development of control sequences 320. These engineering computer instructions allow user-configurable safety shutdown and startup sequences to be created, which control operation of subsea/topside field devices.

The engineering client configuration tool 300 can include engineering computer instructions for automated development of hydrate mitigation sequences 340. These engineering computer instructions allow user-configurable hydrate mitigation sequences to be created, which control operation of subsea/topside field devices.

The engineering client configuration tool 300 can include engineering computer instructions providing entry tool choices for client configuration and allowing a user to select an entry tool 350. These engineering computer instructions allow a user to enter logical conditions.

The engineering client configuration tool 300 can include engineering computer instructions for saving an entry tool for an interlock configuration, a control sequence, a hydrate mitigation configuration or combinations thereof 360. These engineering computer instructions allowing a logical string to be converted to a script to be stored to the controller.

The engineering client configuration tool 300 can include engineering computer instructions for creating a script for conversion using the entry tools to create control code for use by a programmable logic controller 380. These engineering computer instructions allow the script to be loaded into the controller.

The engineering client configuration tool 300 can include engineering computer instructions to allow a user to assign text to one or more lookup tables, thereby creating a comprehensive relationship between object instances and the subsea/topside field equipment graphically represented on the customized control graphic 390. These engineering computer instructions provide an easy to understand programming tool.

Figure 5:
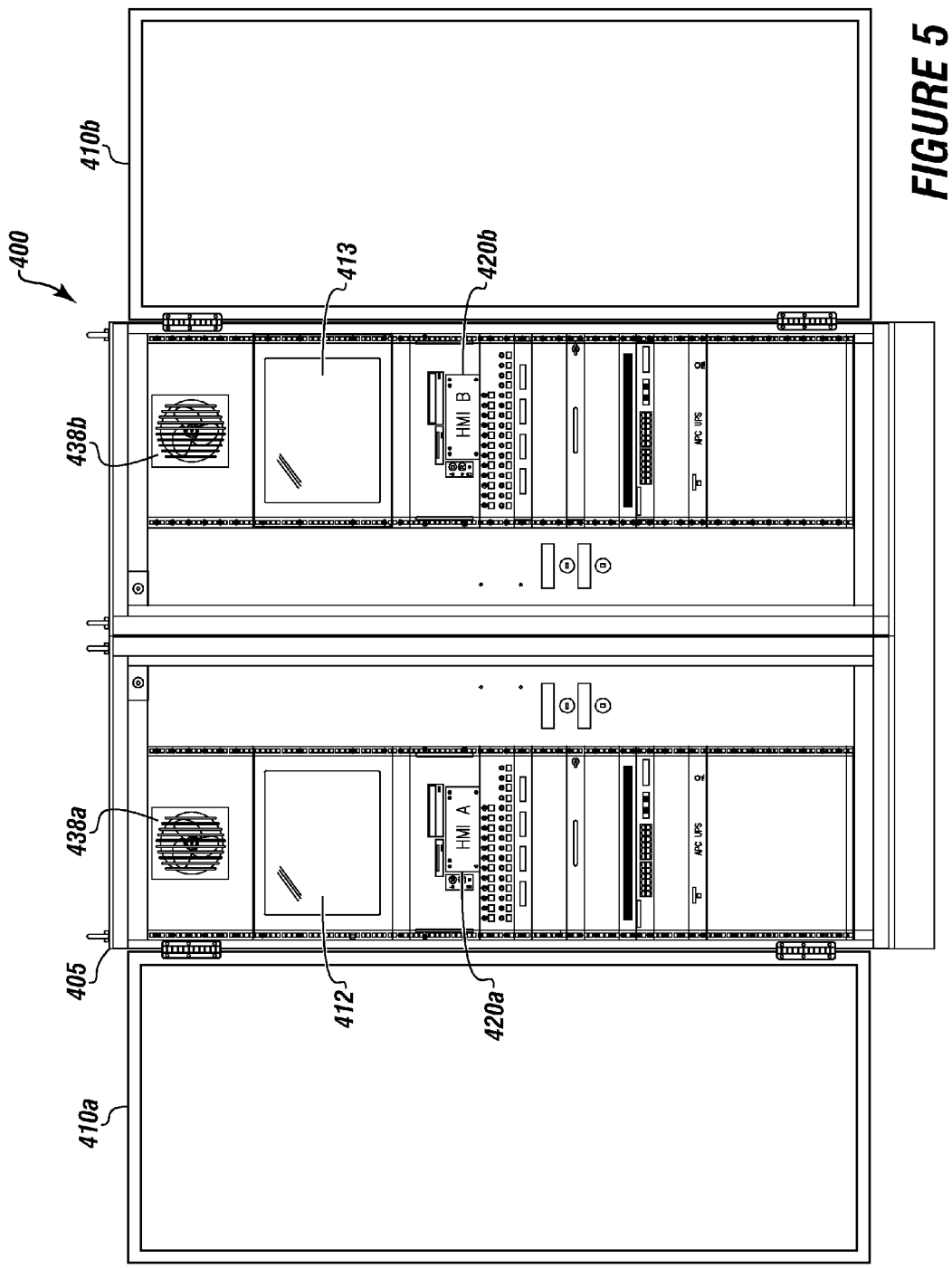
FIG. 5 depicts a universal master control station according to one or more embodiments.

FIG. 5 depicts a universal master control station according to one or more embodiments.

The universal master control station 400 can include a housing 405. The housing 405 can include one or more doors 410*a* and 410*b*.

One or more display monitors 412 and 413 can be mounted in the housing 405. The first display monitor 412 can be in communication with a first human machine interface module 420*a* and a second human machine module 420*b*. The second display monitor 413 can be in communication with a second human machine interface module 420*b* and first human machine interface module 420*a*.

One or more cooling fans 438*a* and 438*b* can be located within the housing 405. The cooling fan 438 can cool the interior of the housing 405.

Figure 6:
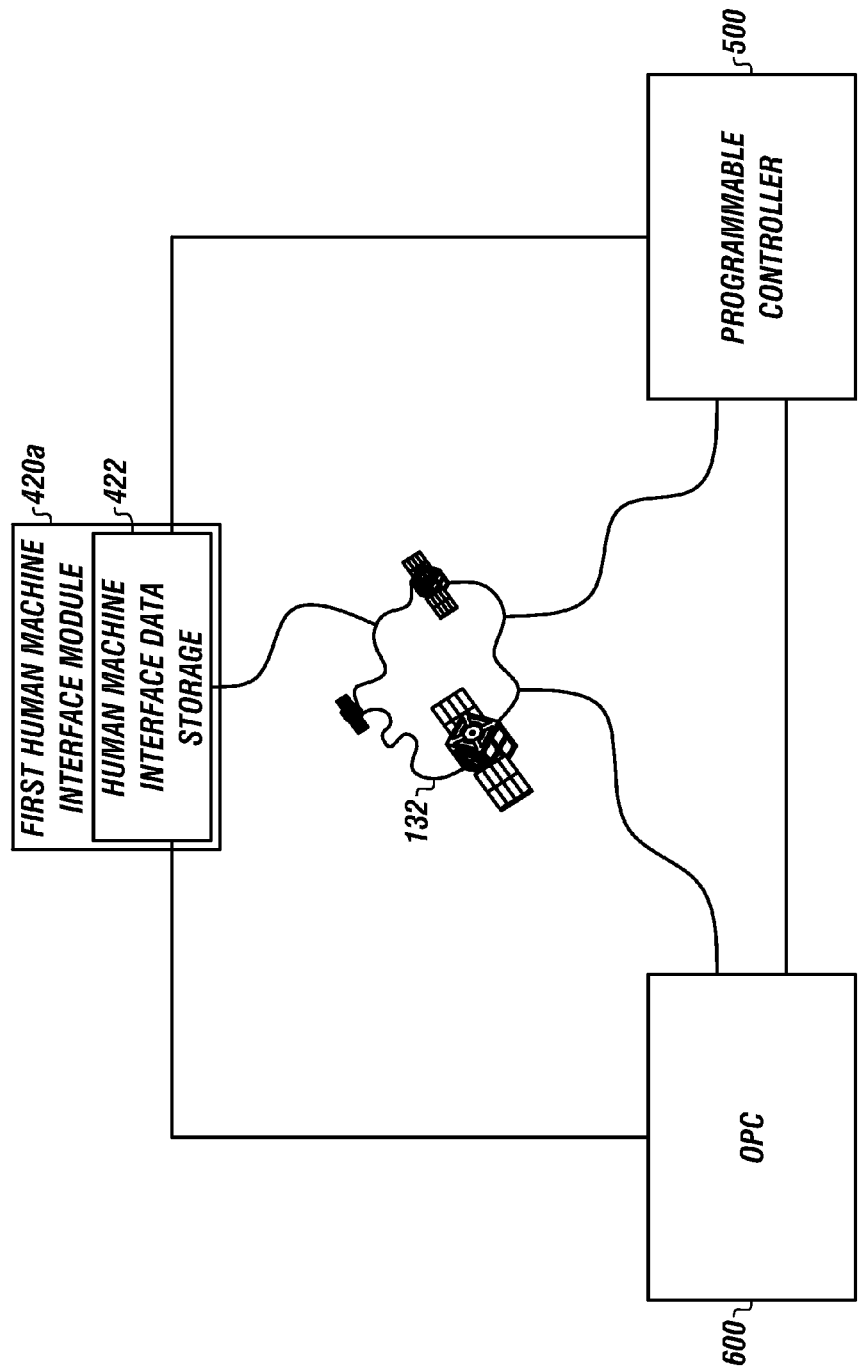
FIG. 6 depicts a human machine interface module according to one or more embodiments.

FIG. 6 depicts a human machine interface module according to one or more embodiments.

The human machine interface modules 420*a* and 420*b* can be substantially similar to one another. For clarity only the first human machine interface module 420*a* is discussed in detail.

The first human machine interface module 420*a* can include a human machine interface data storage 422.

The human machine interface data storage 422 can communicate with a programmable controller 500 over the network 132. The programmable controller can be configured to communicate over a network. The programmable controller can be configured to receive one or more inputs, provide one or more outputs, or combinations thereof. The inputs can be inputted locally, remotely, or combinations thereof.

A standardized communication layer, such as OPC server 600, can be in communication with the programmable controller 500, the human machine interface data storage 422, or combinations thereof, through the use of the network 132.

FIG. 7 depicts the human machine interface data storage 422 according to one or more embodiments.

The human machine interface data storage 422 can include computer instructions to receive and store one or more base graphics therein 424. These computer instructions allow a customized control graphic to be added to the system.

The human machine interface data storage 422 can include computer instructions to monitor and control an electrical power unit (EPU) of equipment controlled by the human machine interface 426. These computer instructions allow a customized EPU graphic to be added to the system.

The human machine interface data storage 422 can include computer instructions to monitor and control a hydraulic power unit (HPU) of equipment controlled by the human machine interface 428. These computer instructions allow a customized HPU graphic to be added to the system.

The human machine interface data storage 422 can include computer instructions to provide an alarm history for alarms occurring with the system 430. These computer instructions can provide current and historical alarm information.

The human machine interface data storage 422 can include computer instructions to provide an event log when non-alarm events occur 432. These computer instructions can provide current and historical event information.

The human machine interface data storage 422 can include computer instructions to provide trending using values recorded by the universal master control station 434. These computer instructions can provide current and historical data log information.

The human machine interface data storage 422 can include computer instructions for scrolling, sorting, filtering, and refreshing trending 436. These computer instructions can provide a user interface to the trending graphic screen.

The human machine interface data storage 422 can include computer instructions for monitoring of tampering with equipment or pipelines 440. These computer instructions can provide security against unauthorized software modification or device operation.

The human machine interface data storage 422 can include computer instructions for a time stamp 444. These computer instructions provide a timestamp record for alarm occurrences, event occurrences, and data log occurrences for historical analysis.

The human machine interface data storage 422 can include computer instructions for an alarm class 448. These computer instructions allow an alarm to be assigned to a parent object.

The human machine interface data storage 422 can include computer instructions for an alarm message 450. These computer instructions provide a descriptive explanation of the fault condition.

FIG. 8 depicts a schematic of a programmable controller 500 according to one or more embodiments.

The programmable controller 500 can be a programmable logic controller.

The programmable controller 500 can include a logic controller power supply 532.

The programmable controller 500 can include a programmable logic controller processor 534 and an Ethernet interface 536.

The programmable controller 500 can also include computer instructions for programmer fault finding allowing redundant monitoring and redundant manipulation for the universal master control station 538. These computer instructions can be stored on a computer readable medium 537 in communication with the programmable logic controller processor 534.

Figure 9:
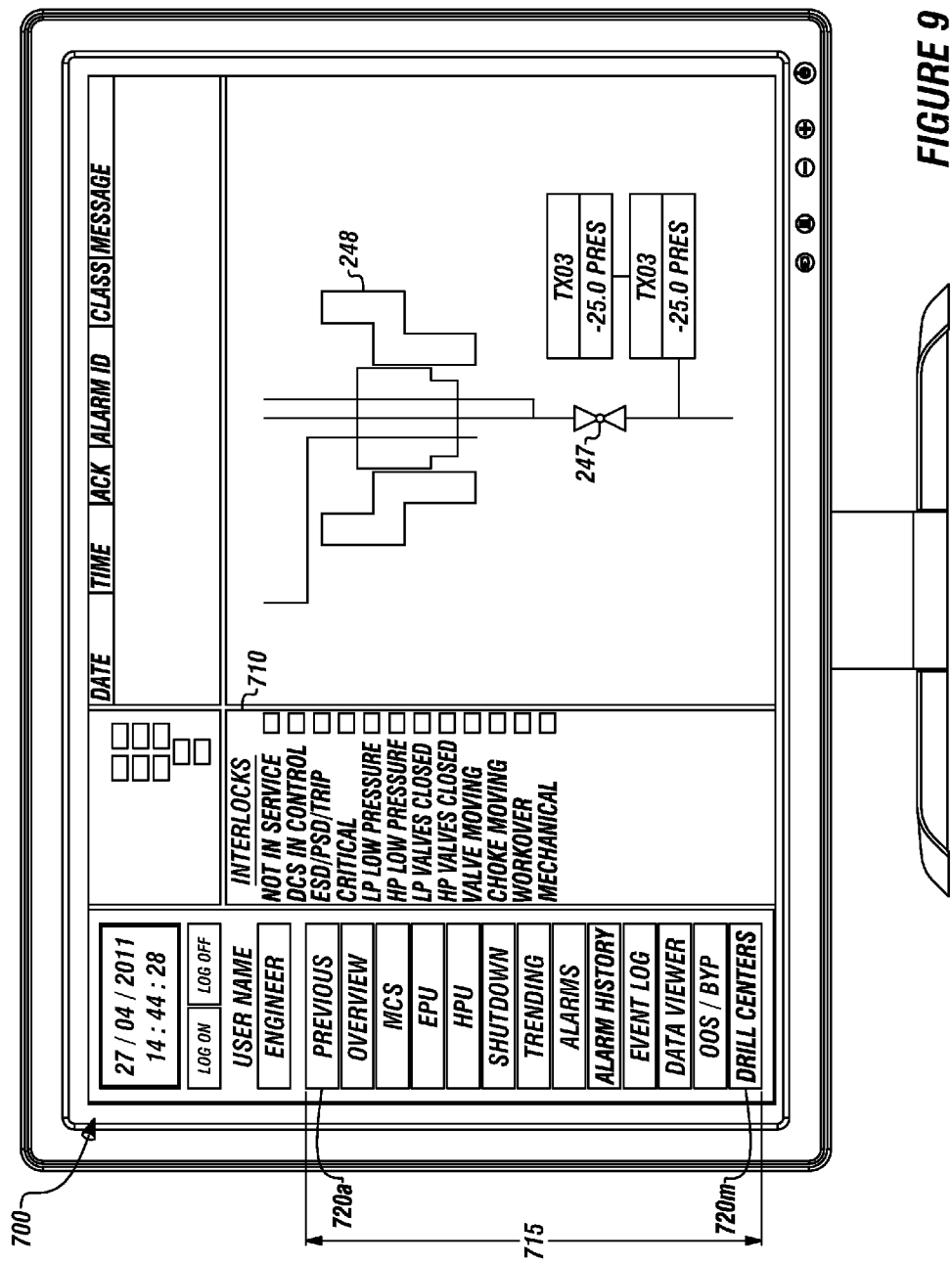
FIG. 9 depicts a screen shot of a system designed using the human machine interface client configuration tool according to one or more embodiments.

FIG. 9 depicts a screen shot of a system designed using the human machine interface client configuration tool according to one or more embodiments. The system can be displayed on an interface screen 700. The system can include one or more parent object instances 248, such as a platform, and one or more child object instances 247, such as a valve.

The interface screen 700 can include an interlock section 710. The interlock section 710 can communicate with the engineering computer instructions for automated development of custom interlocks. The interlock section 710 can display developed interlocks.

The interface screen 700 can also include a menu section 715. The menu section 715 can include a plurality of links for accessing information 720a-720m. The information can include alarms, alarm records, drill centers, trending, overview, or other relevant information.

Figure 10:
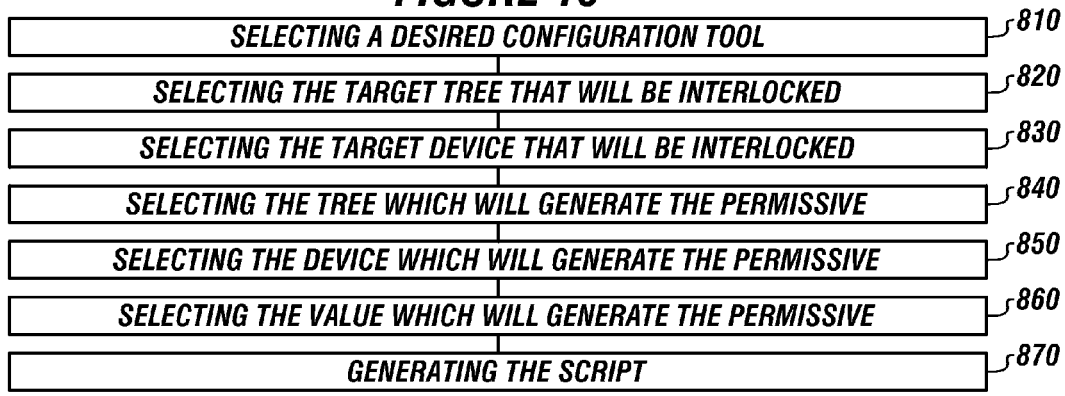
FIG. 10 depicts a logic diagram for forming sequence and interlock customization using the engineering client configuration tool according to one or more embodiments.

FIG. 10 depicts a logic diagram for forming sequence and interlock customization using the engineering client configuration tool according to one or more embodiments.

The interlock sequence can be formed by selecting a desired configuration tool such as valve interlocks, advanced interlocks, shutdown sequences, advanced sequences, or combinations thereof, as depicted in box 810.

The target tree that is going to be interlocked can be selected, as indicated in box 820.

After the target tree that is going to be interlocked is selected, a device that is going to be interlocked can be selected, as indicated in box 830.

Then, in box 840, a tree which will generate the permissive can be selected. The interlock customization can also include selecting a device which will generate the permissive, as indicated in box 850.

In box 860, the value that will generate the permissive can be selected. After the permissive is selected, the script can be generated, as indicated in box 870.

While these embodiments have been described with emphasis on the embodiments, it should be understood that within the scope of the appended claims, the embodiments might be practiced other than as specifically described herein.

What is claimed is:

1. A system for controlling subsea components from multiple manufacturers, each having a proprietary communication interface, wherein the system comprises:
   a. a client configuration processor;
   b. a client configuration data storage connected with the client configuration processor, wherein the client configuration data storage comprises:
      i. a plurality of class objects wherein each class object comprises: a symbolic graphic, a configuration pop-up, an object method, and control logic;
      ii. a human machine interface client configuration tool in the client configuration data storage, wherein the human machine interface client configuration tool comprises:
         1. a library of subsea components, wherein the library of subsea components comprises a plurality of object instances comprising parent object instances and child object instances, wherein each object instance is linked to one of the class objects;
         2. computer instructions to input and modify configurable set points using the configuration pop-up associated with each object instance;
         3. computer instructions to create an interlock status graphic for each parent and child object instance;
         4. computer instructions to create configurable alarms for each parent and child object instance;
         5. computer instructions allowing a user to assign a memory location for each parent and child object instance;
         6. computer instructions allowing a user to assign a parent to each child object instance;
         7. computer instructions to form a set of object instances creating an object pool, wherein one or more of the child object instances in the object pool can be assigned to a parent object instance;
         8. computer instructions enabling at least one of the object instances to be assigned to subsea/topside field equipment;
         9. a library of symbols to graphically depict subsea/topside field equipment;
         10. computer instructions to permit a user to select the symbols and orient the symbols forming a base graphic;
         11. computer instructions to enable a user to select a parent object instance, child object instance or combinations thereof and place each selected object instance onto the base graphic forming a customized control graphic for existing equipment;
         12. computer instructions to replicate object instances for use on the base graphic;

13. computer instructions to display configuration pop-ups, configurable set points, and status information from each selected object instance onto the base graphic;
14. computer instructions to allow modification of the configurable set points for one or more of the object instances; and
15. computer instructions to configure alarms for each object instance; and iii. an engineering client configuration tool comprising:
1. engineering computer instructions for automated development of custom interlocks;
2. engineering computer instructions for automated development of control sequences;
3. engineering computer instructions for automated development of hydrate mitigation sequences;
4. engineering computer instructions providing entry tool choices for client configuration and allowing a user to select an entry tool;
5. engineering computer instructions for saving an entry tool for an interlock configuration, a control sequence, a hydrate mitigation sequence, or combinations thereof;
6. engineering computer instructions for creating a script for conversion using the entry tools to create control code for use by a programmable controller; and
7. engineering computer instructions to allow a user to assign text to one or more lookup tables, thereby creating a comprehensive relationship between object instances and the subsea/topside field equipment graphically represented on the customized control graphic; and c. a universal master control station comprising:
 i. a housing comprising a door;
 ii. a display monitor mounted in the housing; and
 iii. a human machine interface module located within the housing, wherein the human machine interface module is configured to receive input from a user and display current status of at least one critical device and at least one health of communication layers, wherein the human machine interface module comprises:
  1. a human machine interface data storage, wherein the human machine interface data storage comprises:
   a. computer instructions to receive and store the base graphic therein;
   b. computer instructions to monitor and control an electrical power unit controlled by the human machine interface; and
   c. computer instructions to monitor and control a hydraulic power unit controlled by the human machine interface; and
  2. a programmable controller, wherein the programmable controller is configured to communicate over a network, receive one or more inputs, produce one or more outputs, or combinations thereof, wherein the universal master control station is configured to monitor, control, or combinations thereof multiple components from multiple manufacturers via one or more communication layers.

2. The system of claim 1, wherein the universal master control station comprises a plurality of human machine interface modules.

3. The system of claim 2, wherein each human machine interface module is in communication with a display monitor.

4. The system of claim 1, further comprising computer instructions to add an object instance without disability or stopping the operation of the universal master control station in the client configuration data storage.

5. The system of claim 1, wherein the subsea/topside field equipment comprises a member of the group consisting of: piping, valves, chemical injection valves, tree valves, intelligent valves, safety valves, chokes, sensors, sand detectors, injection well flow detectors, down hole measurement sensors, erosion detectors, and combinations thereof.

6. The system of claim 1, further comprising computer instructions in the human machine interface data storage to provide an alarm history for alarms occurring with the system.

7. The system of claim 6, wherein the human machine interface data storage further comprises: (i) computer instructions for a time stamp, (ii) computer instructions for an alarm identification (iii) computer instructions for an alarm group, (iv) computer instructions for an alarm message, and (v) combinations thereof.

8. The system of claim 6, wherein the alarm history is grouped by parent objects, child objects, or combinations thereof.

9. The system of claim 1, wherein the human machine interface data storage further comprises computer instructions to provide an event log when non-alarm events are stored in the human machine interface.

10. The system of claim 1, wherein the human machine interface data storage further comprises to provide trending using values recorded by the universal master control station.

11. The system of claim 10, wherein the human machine interface data storage further comprises computer instructions for scrolling, sorting, filtering, and refreshing trending.

12. The system of claim 1, wherein the human machine interface data storage further comprises computer instructions for monitoring of tampering with equipment or pipelines stored in each of the synchronized human machine interfaces.

13. The system of claim 1, wherein the human machine interface data storage further comprises for monitoring of software failure occurring due to writing bad code and improper use of the system.

14. The system of claim 1, wherein the programmable controller is a programmable logic controller comprising:
a. a programmable logic controller power supply;
b. a programmable logic controller processor;
c. an Ethernet interface; and
d. computer instructions for programmer fault finding allowing redundant monitoring and redundant manipulation for the universal master control station.

15. The system of claim 1, further comprising a remote terminal unit in communication with each human machine interface over a network connecting the universal master control station for continuous monitoring of the universal master control station from a remote location.

16. The system of claim 1, wherein the human machine interface data storage further comprises computer instructions for providing notification to a client device at a remote location when attempts to change or modify a configuration of the universal master control station occurs.

* * * * *